United States Patent
Wang

(10) Patent No.: US 7,362,810 B2
(45) Date of Patent: Apr. 22, 2008

(54) POST-FILTER FOR DEBLOCKING AND DERINGING OF VIDEO DATA

(75) Inventor: Ren-Yuh Wang, Cupertino, CA (US)

(73) Assignee: Sigmatel, Inc., Austin, TX (US)

( * ) Notice: Subject to any disclaimer, the term of this patent is extended or adjusted under 35 U.S.C. 154(b) by 605 days.

(21) Appl. No.: 10/438,306

(22) Filed: May 13, 2003

(65) Prior Publication Data

US 2004/0228415 A1 Nov. 18, 2004

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.29
(58) Field of Classification Search ............ 375/240.29
See application file for complete search history.

(56) References Cited

U.S. PATENT DOCUMENTS 6,539,060 B1 * 3/2003 Lee et al. .............. 375/240.29
6,807,317 B2 * 10/2004 Mathew et al. ............. 382/266
6,950,473 B2 * 9/2005 Kim et al. ............. 375/240.29
7,215,823 B2 * 5/2007 Miura et al. ................ 382/268
2004/0247034 A1 * 12/2004 Zhong et al. .......... 375/240.29
2007/0269128 A1 * 11/2007 Park et al. .................. 382/268

\* cited by examiner

*Primary Examiner*—Nhon Diep
(74) *Attorney, Agent, or Firm*—Toler Law Group, Intellectual Properties

(57) ABSTRACT

An implementation of an MPEG-4 compliant post-filter for image data, which performs deblocking and deringing post-filtering on decoded video data. The post-filter comprises two independent processing units, one for horizontal deblocking and the other for vertical deblocking and deringing, each processing unit in communication with a memory system, which can include DRAM. The post-filter further comprises a local memory, which can be SRAM, for high speed access to data being processed by the vertical deblocking and deringing filter, without additional accesses to the memory system. Further, horizontal deblocking and vertical deblocking and deringing functions can be performed concurrently in a pipe-lined fashion.

49 Claims, 7 Drawing Sheets

HORIZONTAL DEBLOCKING ORDER

POST-FILTER FOR DEBLOCKING AND DERINGING OF VIDEO DATA

BACKGROUND

1. Field of the Invention

This invention relates to data compression and decompression in a video encoding/decoding system, and in particular, to filtering algorithms and their associated hardware for post-processing of previously decoded image data.

2. Discussion of Related Art

Video communication equipment, such as videoconferencing systems and videophone devices, have enabled people to communicate visually without having to travel to a common location. However, in general the communication channels linking the video communication equipment do not have the necessary bandwidth to carry real-time video or multi-media data. In order to transmit video images over standard communications channels, the data must be compressed to reduce the data rate required of the transmission channel. The data stream, for example, may then be transmitted over a phone line, an Integrated Services Digital Network line (ISDN), or the Internet.

In a typical videoconferencing system, the data stream is received at the remote location, where it is decoded into a series of images, and displayed on a suitable viewing apparatus. Depending on the equipment used, the decoding process typically operates at one to thirty frames per second. In typical encoding/decoding algorithms, images are processed in blocks of pixels. Typically, an image is separated into an array of 16 block by 16 block Macroblocks. Each of the Macroblocks can include six (6) 8×8 blocks of data, separated into a 16×16 Y block, an 8×8 U block and an 8×8 V block. In general, the notation N×M block means an N bytes by M bytes block of data.

In processing a moving picture, blocks such as those described above are individually processed to maximize the compression ratio. However, artifacts can arise upon reconstruction of the image from the blocks, in which the boundaries between blocks do not blend smoothly, and are perceived by the human eye as "blockiness" or as having large granularity in the image at the boundaries of the blocks. Another artifact, called ringing, can also appear in reconstructed images. Ringing artifacts occur at the boundary of sharp edges in the transmitted image, and are therefore particularly evident in animation. Ringing can result from the quantization process which truncates high frequency coefficients of a compression transformation.

The "blockiness" and the ringing can be removed by a deblocking filter and a deringing filter, respectively, as described in the MPEG-4 standard. A de-blocking filter smoothes the boundaries between the blocks, making the blockiness less apparent to human viewers. A deringing filter removes the effects of ringing. Because image quality depends critically on transmission rate, there is an ongoing need for faster image processing systems to perform these filtering functions.

SUMMARY

In accordance with the present invention, a post filter that includes deblocking and deringing filters that provide faster decoding is presented. A post filter according to the present invention includes a deblocking filter, a deringing filter, and a local memory for internal data storage. In some embodiments, the local memory may be SRAM memory. In some embodiments, the deblocking filter interacts with a first memory area external to the post filter and the deringing filter interacts with the first memory area, a second memory area external to the post filter, and the local memory. In some embodiments, the first memory area and the second memory area can be in a DRAM memory.

In some embodiments, the post filter is implemented in a MPEG-4 decoder by applying the deblocking filter and the deringing filter in two, in some embodiments concurrently occurring, steps. First, the horizontal deblocking filter is executed, and the resulting data is written into the first memory. Second the data is read from the first memory and loaded into the local memory, where vertical deblocking and deringing functions are performed. The filtered data is then written into the second memory area. Data in the second memory, then, is filtered video data ready for transmission for display.

Post filters in accordance with the present invention thereby reduce the conversation time required between the post filter and the processing memory that includes the first memory area and the second memory area by utilizing local, dedicated memory. In some embodiments, data supplied to the controllers from local memory are accessible within a single clock cycle. In some embodiments, the post-filtering operations can take place while transferring data between external memory and the local memory of the post filter.

These and other embodiments are further discussed below with reference to the associated drawings.

DETAILED DESCRIPTION

A variety of compression and decompression algorithms exist to encode and decode video data. As discussed above, typically these algorithms involve dividing the image to be transmitted into blocks and compressing the blocks according to a video compression standard. Most algorithms involve removing spatial and/or temporal redundancy. Temporal redundancy can be removed by identifying a portion of the image that changes little from frame to frame, and creating motion vectors to describe that portion's motion between frames. In this way, a group of blocks corresponding to the slowly changing portion may be moved as a unit by transmitting the pixels more fully describing the portion once and then, for at least one subsequent frame, specifying the motion vector describing motion of the portion, rather than re-transmitting the entire set of pixels in the group of blocks corresponding to the portion for each frame of video data transmitted.

Spatial redundancy can be removed by performing a frequency transformation on the image, and only transmitting those portions of the frequency spectrum to which the human eye is sensitive. A common frequency transformation utilized for removing spatial redundancy is the Discrete Cosine Transform (DCT). After the image is divided into blocks, a DCT is performed on the blocks, and the coefficients of the transformation are quantized. The quantization interval indicates the spacing between coefficients in a set of coefficients describing a particular frequency contribution in the transform, and therefore determines the number of discreet coefficients utilized to describe the contribution of that frequency component to the data. The quantization coefficient for high frequency components can be relatively large (i.e., utilizing a fewer number of individual coefficients) because the human eye is relatively insensitive to rapid fluctuations, i.e. rapid changes in spatial variation, over the image. Thus, coefficients for high frequency contributions can be encoded using a short code word, and coefficients for low frequency contributions can be encoded with a long code word. The quantization portion of the compression algorithm can result in an irretrievable loss of data in the transmission.

The usual block size utilized in data compression algorithms is 8×8 pixels. The coefficients of the transformation utilized (e.g., the DCT coefficients) can be quantized using quantization values derived from a predetermined quantization table. The resulting data is then compressed, for example through run length coding (RLC) such as described in the commonly owned application "Error Concealment and Error Resilience," by Yi-Yung Jeng, U.S. application Ser. No. 10/438,298, filed herewith on the same day as is the present disclosure, herein incorporated by reference in its entirety.

Figure 1:
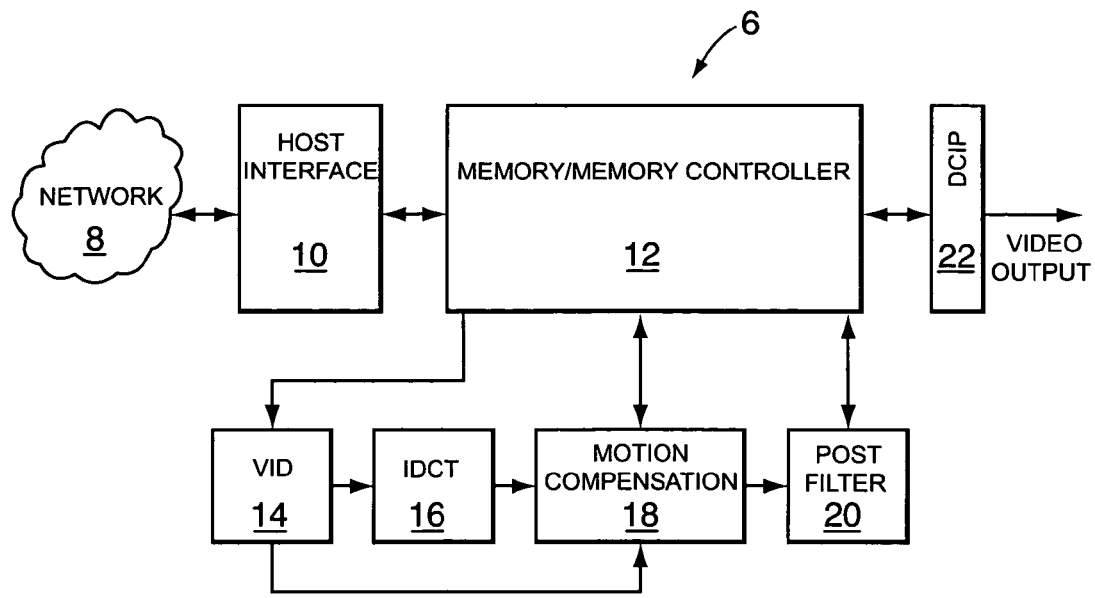
FIG. 1 is a schematic diagram of an overall system configuration including a post-filter according to the present invention.

FIG. 1 shows a schematic diagram of an embodiment of a decoding image processor 6 with a post-filter 20 according to the present invention. Processor 6 includes a variable length decoder (VLD) 14, an inverse discrete cosine transformer (IDCT) 16, a motion compensation (MC) module 18, and a post-filter 20, all in communication with a memory/memory controller 12 (referred to as memory module 12). Memory module 12 includes memory and a memory controller. The memory of memory module 12 can be, for example, dynamic random access memory (DRAM), flash RAM, static random access memory (SRAM), magnetic or optical disk drives, or other data storage device, can be utilized for the memory in memory module 12.

A video stream is input to memory module 12 from a host interface 10, which is in communication with an external network 8. Memory module 12 stores and routes the data to variable length decoder (VLD) 14. VLD 14 processes the data, received through host interface 10, to recover a data stream that had been encoded in a corresponding variable length encoder. The data stream output by VLD 14 is input to inverse discrete cosine transform unit (IDCT) 16. IDCT 16 transforms the DCT coefficients transmitted as part of the data stream, which form a frequency space representation of an image, to the corresponding image represented in real space. The data output from IDCT 16 is then input to motion compensation module 18. VLD 14 also outputs motion vectors from the received data stream to motion compensation module 18.

Motion compensation (MC) module 18 receives the data output from IDCT 16 and the motion vectors of the received data stream from VLD 14. Motion compensation module 18 then uses the motion vectors to reconstruct the image into, for example, YUV: 420 data. The 420 suffix indicates that the data conform to a 4:2:0 sampling scheme, wherein for a group of four video pixels, the Y data is sampled four times, whereas the U and V data are sampled only once. As discussed above, an image can be represented by a 16×16 array of macroblocks. Additionally, a macroblock of image data (MB) is represented in YUV:420 format by a two by two array of 8×8 blocks of Y data, and the U data and V data are contained in two additional 8×8 blocks of data.

Motion compensation module 18 outputs the pixel data to post-filter 20, for example in the format of 16×16 arrays for Y data, followed by an 8×8 array of U data, an 8×8 array of V data, and the quantization parameters (QP). In some embodiments, the post-filter 20 operates on the Y data first, and stores the U and V data in memory module 12 for later processing. After post filter 20 processes the image data, the data is output to a display device such as a television or liquid crystal display (LCD), by memory module 12 through a decoder image processor (DCIP) 22, which processes data from memory module 12. The structure and operation of post-filter 20 is further described below.

Figure 2:
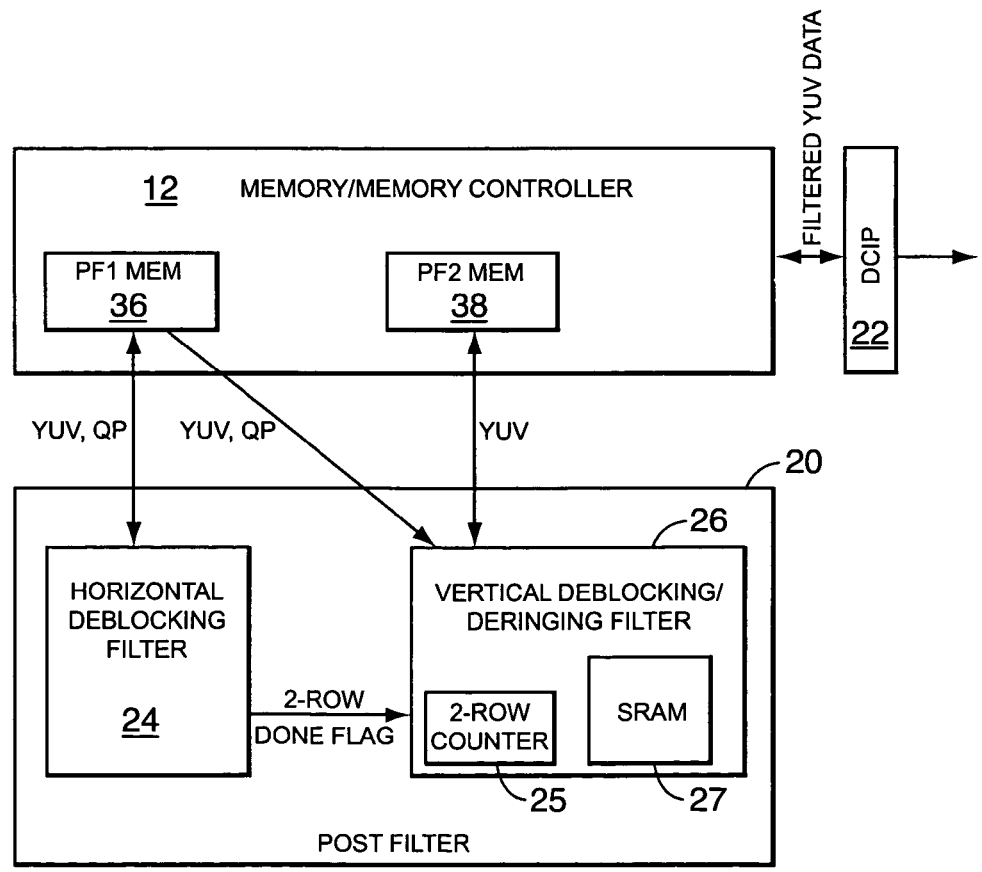
FIG. 2 shows the architecture of an embodiment of a post-filter according to the present invention.

As shown in FIG. 2, memory module 12 can reserve multiple sections of memory for use by the modules of processor 6. In the embodiment of post filter 20 illustrated in FIG. 2, memory module 12 includes a first memory area, PF1 MEM 36, and a second memory area, PF2 MEM 38. In some embodiments, such as that shown in FIG. 2, post filter 20 includes two primary filter modules: a horizontal deblocking filter 24 and a vertical deblocking and deringing filter 26. Horizontal deblocking filter 24 is in communication with the first memory area, PF1 MEM 36, and vertical deblocking and deringing filter 26 is in communication with both the first memory area and the second memory area, PF1 MEM 36 and PF2 MEM 38, respectively. Therefore, in some embodiments, the first memory area, PF1 MEM 36, can be utilized by both filter modules 24 and 26, while the second memory area, PF2 MEM 38, may store only data output by the vertical deblocking and deringing filter 26. In some embodiments, memory areas PF1 MEM 36 and PF1 MEM 38 can be of any size large enough to store at least one image. In some embodiments, the size of memory allocated for each of PF1 MEM 36 and PF2 MEM 38 is large enough to store a few blocks of data. In some embodiments, the size of memory allocated for each of PF1 MEM 36 and PF2 MEM 38 is large enough to store one or more images. The size of PF1 MEM 36 and 38, then, depends on the video standard.

Horizontal deblocking filter 24 receives the YUV and QP data from MC module 18 (see FIG. 1), performs horizontal deblocking, and stores that processed data into PF1 MEM 36 of memory module 12. Vertical deblocking and deringing filter 26 retrieves the data from PF1 MEM 36 and stores data in local memory 27. Vertical deblocking and deringing filter 26 then performs both the vertical deblocking and the deringing filter functions on data stored in local memory 27, before storing the processed data to PF2 MEM 38. From PF2 MEM 38, the processed data are output to the decoder image processor 22. The data output from vertical deblocking filter 26 is sent to the display device through DCIP 22.

The structure of post-filter 20 as shown in FIG. 2, is depicted in accordance with aspects of the present invention, wherein the deblocking operation is performed in two separate steps: horizontal deblocking in horizontal deblocking filter 24 followed by vertical deblocking and deringing in vertical deblocking and deringing filter 26. This approach is in contrast to the prior art (for example the M4VENH MPEG-4 video enhancement chip available from Sci-worx of Hannover, Germany), which completes both the horizontal and vertical deblocking functions before passing the data to a deringing filter for further processing. The horizontal deblocking filter 24 and the vertical deblocking and deringing filter 26 can operate independently and in parallel, so that a data pipeline can be established with a constant data throughput. Embodiments such as that illustrated in FIG. 2 can also reduce the number of accesses to memory module 12, by storing data locally in local memory 27 while that data is being processed by vertical deblocking and deringing filter 26. The data held in local memory 27 can be operated upon by both a vertical deblocking filter as well as a deringing filter before the data stored in local memory 27 is transferred back to PF2 MEM 38 in memory module 12.

Figure 3:
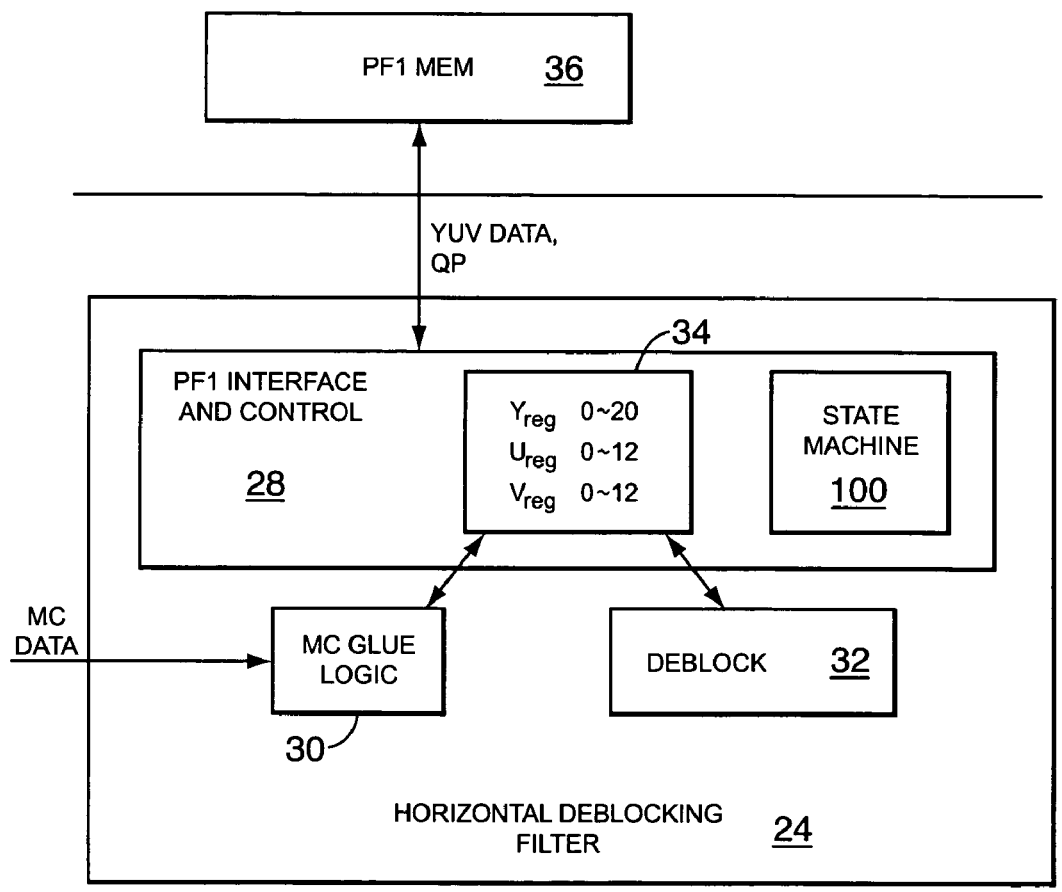
FIG. 3 shows further detail of a horizontal deblocking filter of a post filter according to the present invention.
Figure 6:
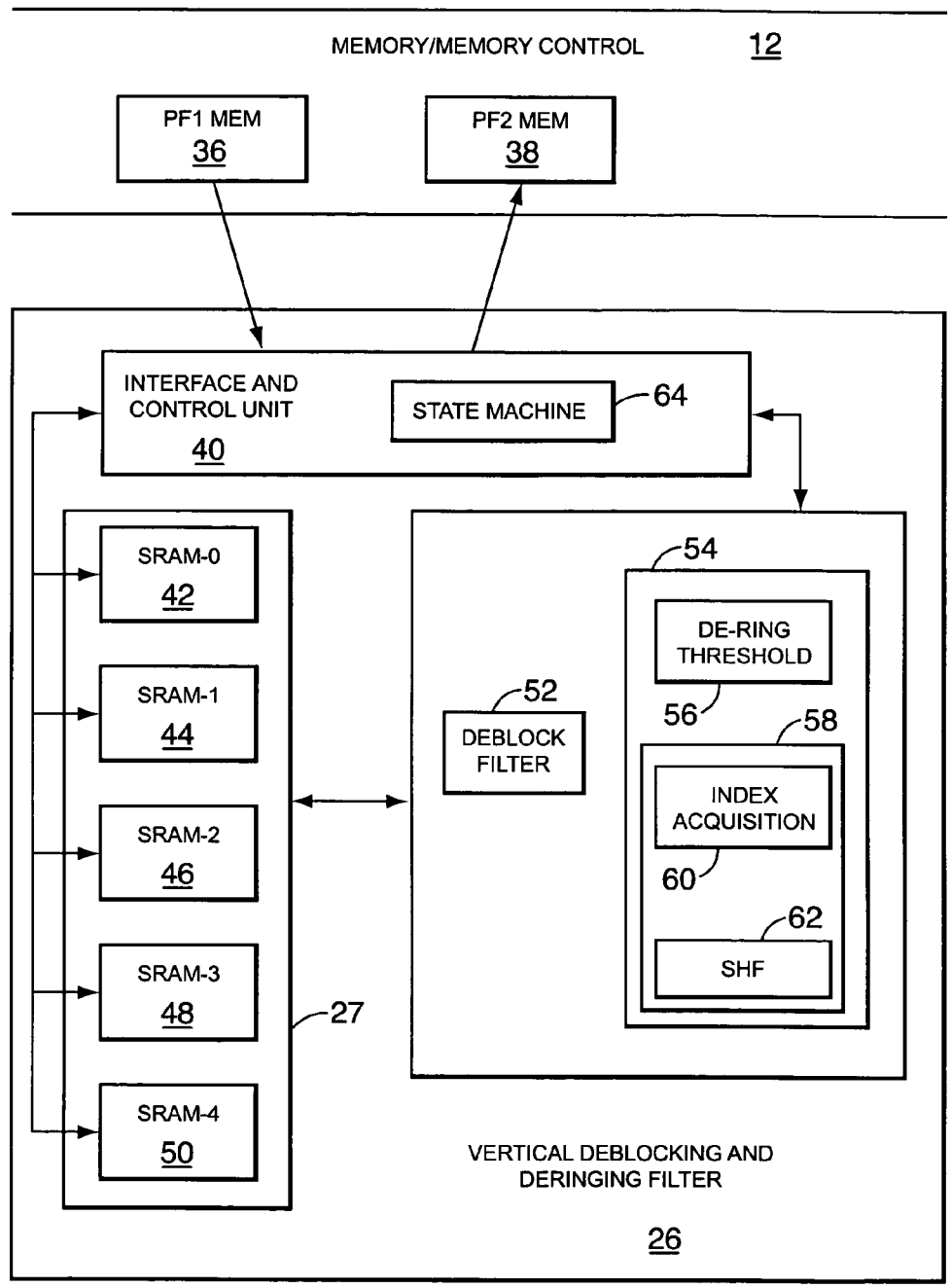
FIG. 6 shows a block diagram of an embodiment of a vertical deblocking and deringing filter of a post filter according to the present invention.

As shown in FIGS. 3 and 6, each of horizontal deblocking filter 24 and vertical blocking and deringing filter 26 includes its own independent control unit, PF1 control 28 and PF2 control 40, respectively. PF1 control 28 and PF2 control 40 control the flow of data between memory module 12 and individual modules within horizontal deblocking filter 24 and vertical deblocking and deringing filter 26, respectively. Control units 28 and 40 operate independently with PF1 control unit 28 controlling the function of horizontal deblocking filter 24 and PF2 control unit 40 controlling the function of vertical deblocking and deringing filter 26. Each of the independent control units, PF1 control unit 28 and PF2 control unit 40, is in communication with memory module 12.

An embodiment of horizontal deblocking filter 24 is shown in FIG. 3. Horizontal deblocking filter 24 of FIG. 3 includes PF1 control unit 28, which can further include a number of internal data registers 34. PF1 control unit 28 functions as an interface to memory module 12, and contains functional blocks mc glue module 30 and deblock module 32. The first task of horizontal deblocking filter 24 is to receive the incoming data received from motion compensation module 18 and store the data in registers 34. In some embodiments, functional block mc glue module 30 receives YUV: 420 and QP data from the motion compensation module 18. As described above, the format of the YUV: 420 data is a 16×16 macroblock (MB) of Y data followed by an 8×8 block of U data and finally an 8×8 block of V data. The received data can be stored in registers Y_reg_5 to Y_reg_20, U_reg_5 to U_reg_12, and V_reg_5 to V_reg_12, respectively, in registers 34 of PF1 control unit 28. Y, U and V data that are not needed immediately are stored in PF1 MEM 36 for future use by horizontal deblocking filter 24, which begins a deblocking operation as a first row of Y data is being received by MC glue module 30. The arrangement of the data stored in register 34 control unit 28 during horizontal deblocking is illustrated in FIGS. 4(A) through 4(D).

Figure 4A:
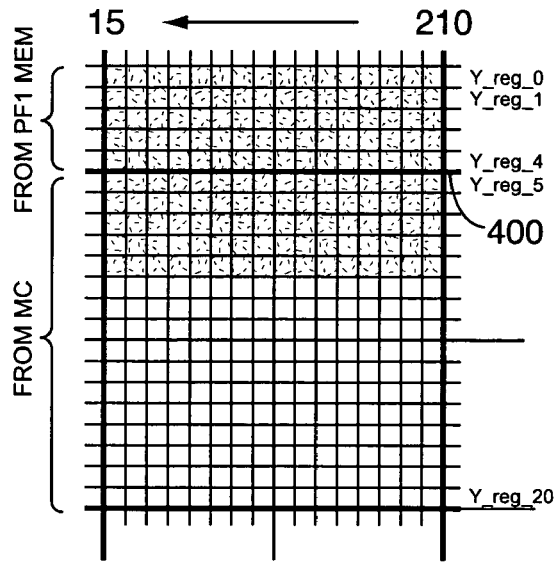
FIGS. 4(A) through 4(D) show a simplified diagram illustrating an embodiment of the data handling algorithm executed by an embodiment of the horizontal deblocking filter shown in FIG. 3.
Figure 4B:
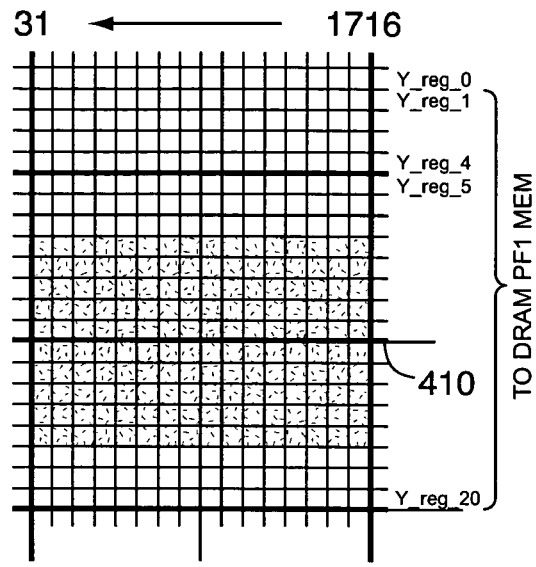
Figure 4C:
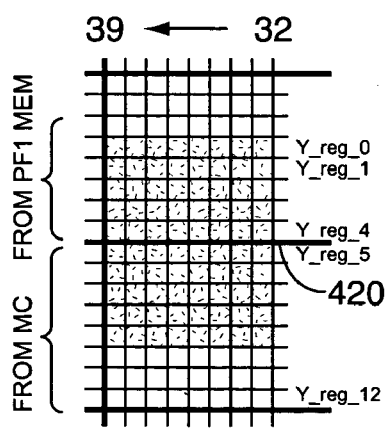
Figure 4D:
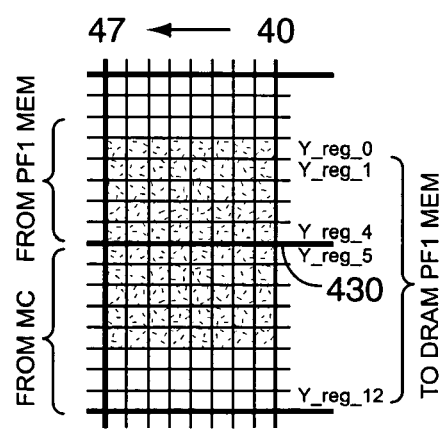

Deblocking filter 32 performs the deblocking operation. Deblocking filter 32 may require a number of rows, for example five rows, of data on either side of a boundary in order to compute filtered values of the data across the boundary. The boundary refers to the borders between adjacent blocks. Therefore, a number of rows of previous data from the same image may be retrieved before deblocking filter 32 begins operation. This previous data can be retrieved from PF1 MEM 36 and stored in registers 34 of the control unit 28. An example is as shown in FIGS. 4A and 4B, wherein the first sixteen rows (Y_reg_5 through Y_reg_20) of data are input from MC module 18, while an additional five rows (Y_reg_0 through Y_reg_4) are input from PF1 MEM 36.

In the deblocking filter operation performed by deblocking filter 32, two modes can be used separately depending on the pixel conditions around a boundary. A boundary is an edge, row or column, in the array of data, such as boundary 400 between Y_reg_4 and Y_reg_5 in FIG. 4(A), for example. If the region is very smooth, with blocking artifacts due to small DC offsets within the block, then a DC offset mode can be selected. In all other cases, a default mode may be used. In some embodiments, 10 pixels of data across the boundary can be utilized to determine whether DC offset mode or Default mode will be applied. This requirement gives rise to the necessity of a number of rows of previous data (e.g., five as shown in FIG. 4(A)) to perform the function of deblocking filter 32 across a boundary. In default mode, a signal adaptive smoothing scheme is applied by differentiating image details at the block discontinuities using the frequency information of the neighboring pixel arrays. In the default mode, only the two boundary pixels are changed. In a very smooth region, filtering in the default mode may not be strong enough to reduce the blocking artifacts due to DC offset. In DC offset mode, a stronger filter may be applied and 8 data pixels may be changed. However, even in DC offset mode, one pixel at the edge of the processed data is left unchanged by the filtering operation. In some embodiments, the deblocking algorithms conform to the MPEG-4 published specification such as ISO/IEC 14496-2 post-processing operations for reduction of block artifacts and noise reduction. The ISO/IEC 14496-2 specification is herein incorporated by reference in its entirety.

The deblocking order within a macroblock can, for example, be from right to left and from top to bottom, as shown in FIGS. 4(A) through 4(D). If a pixel value is changed by a previous filtering operation, the updated pixel value may be used for the next filter operation. When horizontal deblocking filter 24 is finished processing data, the processed data is then stored in PF1 MEM 36.

PF1 control unit 28 includes the interface to memory module 12, data storage registers 34, and state machine 100. PF1 control unit 28 sends requests to MC unit 18 to receive data, reads and writes data to PF1 MEM 36 in memory module 12, and interfaces with vertical deblocking and deringing filter 26.

Figure 5:
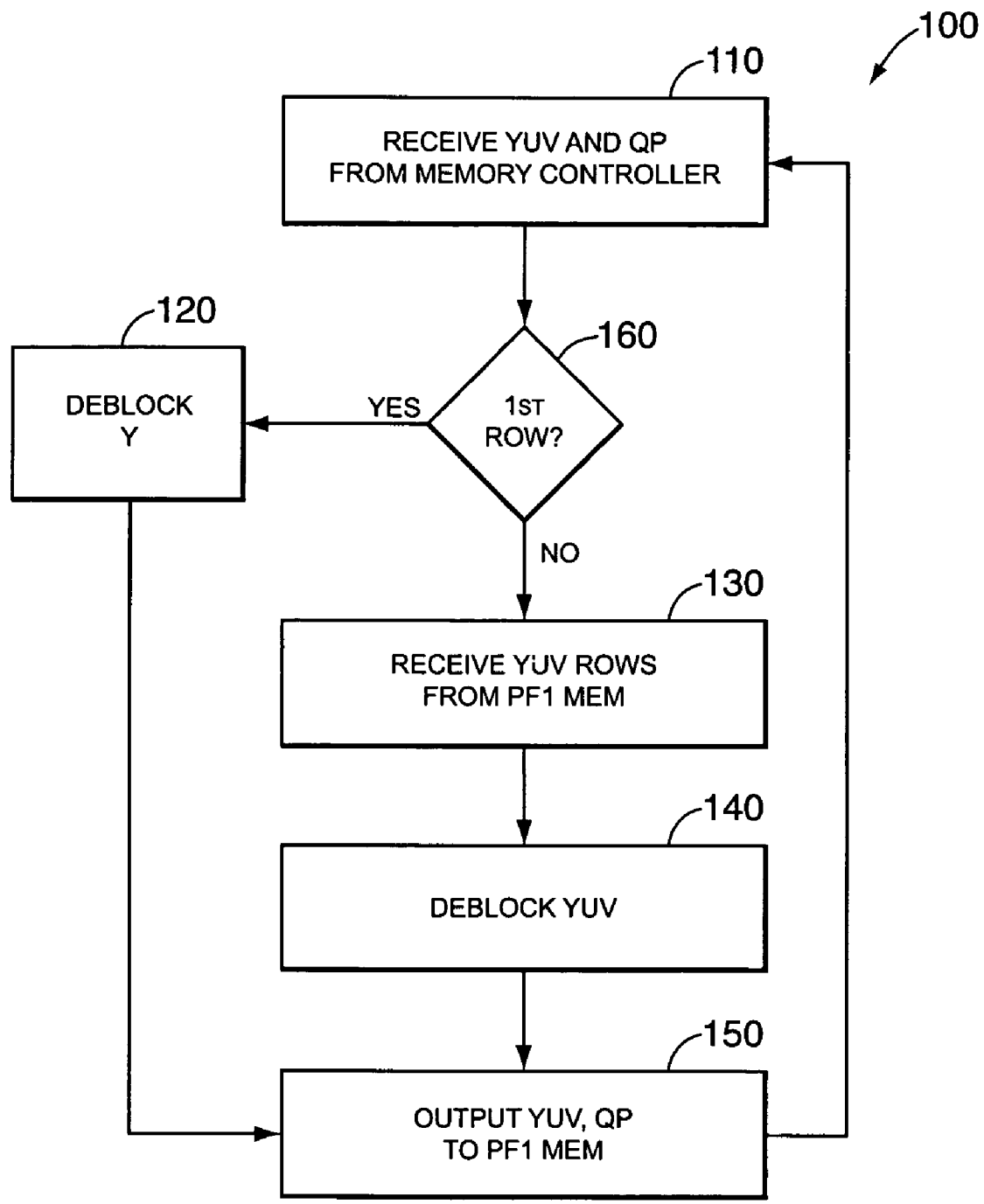
FIG. 5 shows a simplified state diagram for the horizontal deblocking filter shown in FIG. 3.

FIG. 5 illustrates an embodiment of a state machine operation 100 of horizontal deblocking filter 24. Motion compensation module 18 sends a macroblock of YUV data and quantization parameters QP in step 110 of FIG. 5. In some embodiments, data may be stored in PF1 MEM 36 during receipt of the data. In step 160, algorithm 100 checks whether the data currently being processed is from the first row of the macroblock of which the YUV data is a part. In some embodiments, as soon as the second row of the YUV data is being received, horizontal deblocking filter 24 proceeds with the deblocking filter 32 operation.

For a macroblock of Y data in the first row received from MC, the deblocking filter 32 performs 16 deblocking operations on the horizontal boundary row in step 120. The horizontal boundary row is the row of data 410 along the middle of the array. The Y data are then written to PF1 MEM 36 in step 150, along with as yet unprocessed U and V data. The deblocking filter then awaits the arrival of the next macroblock of Y data, until it has completed the first row, and begins the second.

For a macroblock of data in the second and subsequent rows received from MC module 18, PF1 interface and control 28 retrieves data from PF1 MEM 36 to fill the data across the top boundary 400, 420 or 430 (FIGS. 4(A) through 4(D)) in step 130. For example, for the second row of data, the top horizontal boundary 400 shown in FIG. 4(A) is filtered, for which data on the other side of boundary 400 is needed. This data is contained in the last rows of the previously processed macroblock. In a particular example described here, the last five rows of the previous macroblock row can be retrieved from PF1 MEM 36 and loaded into the remaining registers Y_reg_0-Y_reg_4, U_reg_0 to U_reg_4 or V_reg_0 to V_reg_4, as shown in FIGS. 4(A) through 4(D). In the embodiment of horizontal deblocking filter 24 illustrated in FIGS. 4(A) through 4(D), deblocking module 32 then performs 32 deblocking operations on the Y data, and 8 deblocking operations on the U and V data, as indicated in step 140 of FIG. 5. The 32 deblocking operations correspond to 16 deblocking operations performed on the upper boundary, as shown in FIG. 4(A), and another 16 deblocking operations performed along the middle boundary, as shown in FIG. 4(B), which is fully contained within the 16×16 pixel macroblock. The lower boundary must wait for the arrival of the following row before being filtered by horizontal deblocking filter 24.

Once the deblocking process is complete, the Horizontal Deblocking Filter 24 sends a request to the DRAM control unit 12 to write data to the memory. When DRAM controller 12 acknowledges and grants the request, the data in Y_reg_0 through Y_reg_20 are written into PF1 MEM 36 in step 150 of FIG. 5. The next macroblock of Y data is processed as described above, until the entire row is completed. When the two rows are completed, the control unit sets the two rows done flag for the two row counter 25, which alerts vertical deblocking and deringing filter 26 that two rows have been completed by horizontal deblocking filter 24.

U and V data are processed in the same manner as that described above for Y data, as shown in FIGS. 4(C) and 4(D), so that after processing one macroblock of Y data, algorithm 100 performs the deblocking process on one block of U data and one block of V data. As with the Y data, a number of rows, for example five rows, of U and V data that were previously stored in PF1 MEM 36, must be retrieved before algorithm 100 of horizontal deblocking filter 24 can operate on the U and V data in order to have data spanning the horizontal boundary between blocks. The UV data from MC module 18 is loaded into data registers 34, for example U_reg_5 to U_reg_12 (or V_reg_5 to V_reg 12) of registers 34, and data from the previous five rows stored in PF1 MEM 36 are loaded into data registers U_reg_0 to U_reg_4 (or V_reg_0 to V_reg_4) of data registers 34. Upon completion of the processing, registers U_reg_1 to U_Reg_12 (or V_reg_1 to V_reg_12) of data registers 34 are stored in PF1 MEM 36.

In some embodiments, the data stored in the first register Y_reg_0, U_reg_0 or V_reg_0 of data registers 34 does not need to be stored in PF1 MEM 36 because the values stored in those registers are not changed by deblocking filter 32 and therefore have not changed since they were previously stored in PF1 MEM 36. In some embodiments, deblocking filter 32 only modifies 8 pixels of the 10 pixels involved in the filtering operation in the DC offset mode, leaving one pixel at each edge which is unmodified.

When two macroblock rows of data have been processed by horizontal deblocking filter 24, horizontal deblocking filter 24 sends a pulse signal to vertical deblocking and deringing filter 26, indicating that the horizontal deblocking function is finished. In some embodiments, vertical deblocking and deringing filter 26 then can begin processing data.

Therefore, in some embodiments, at least two macroblock rows of data are first processed by horizontal deblocking filter 24 before starting processing by vertical deblocking and deringing filter 26 because the boundary existing between the macroblock rows makes it convenient to process the rows two at a time.

A block diagram of an embodiment of vertical deblocking and deringing filter unit 26 is shown in FIG. 6. Vertical deblocking and deringing filter unit 26 of FIG. 6 includes a deblock module 52, a control unit 40 to interface to PF1 MEM 36 and PF2 MEM 38, a deringing filter 54, and a number of local memory areas of local memory 27. Local memory 27 may, as is shown in FIG. 6, be SRAM memory. In some embodiments, five local memory areas 42, 44, 46, 48, and 50 are utilized to store five macroblocks of data during processing. Memory areas 42, 44, 46, 48 and 50 speed operation of the device, while keeping the memory requirements to a minimum. Memory areas 42, 44, 46, 48, and 50 can be denoted SRAM_0 to SRAM_4, respectively. In some embodiments, each of memory areas 42, 44, 46, 48 and 50 are 128 bit by 18 bit SRAM arrays, although other data storage devices can be utilized.

Figure 7:
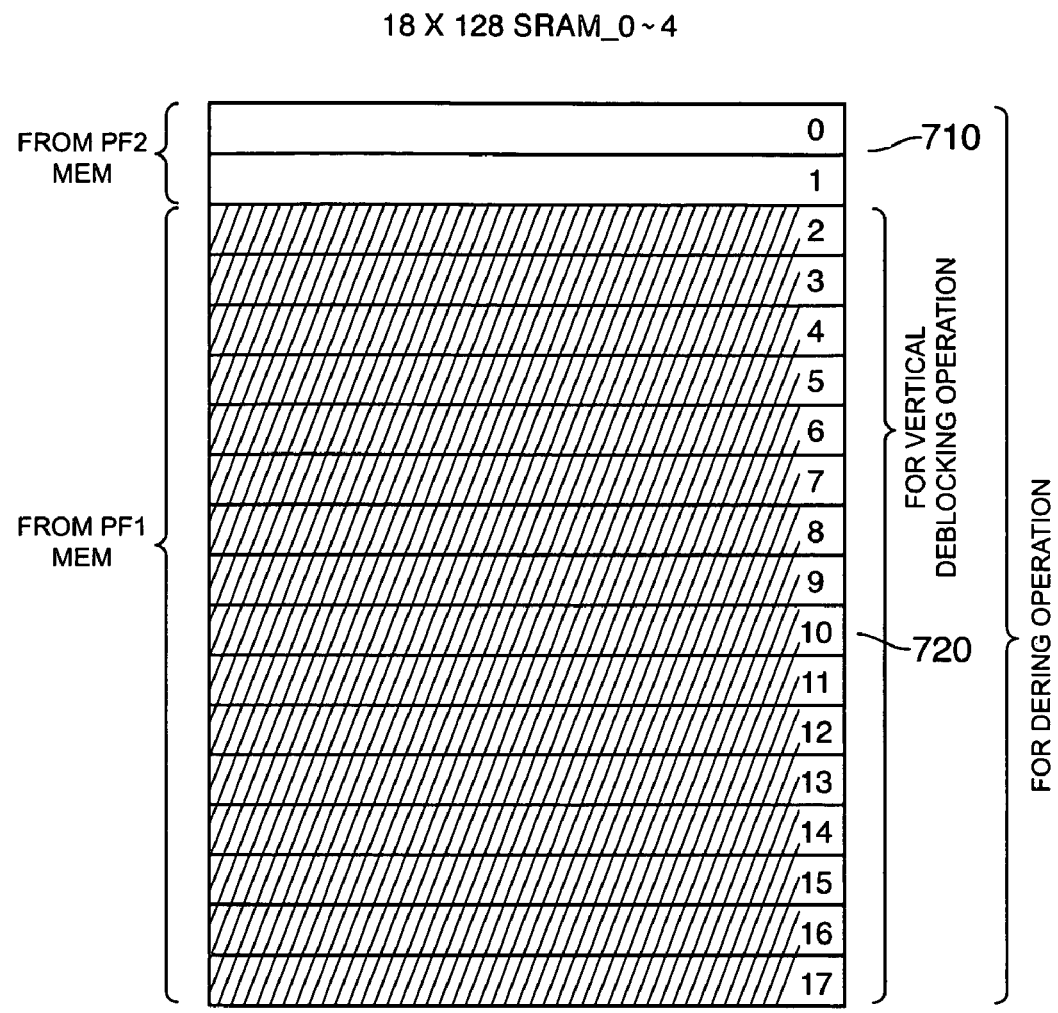
FIG. 7 shows the arrangement of data stored in vertical deblocking and deringing filter shown in FIG. 6.

In some embodiments, deringing filter 54 uses 10×10 pixels of data to process each 8×8 block of data, so that data retrieved from PF1 MEM 36 may be supplemented with previous data to satisfy the input requirements of deringing filter 54. The arrangement of data in memory areas 42, 44, 46, 48 and 50 for some embodiments is shown in FIG. 7. Therefore, while the first row of Y data is processed as is, the second and subsequent rows may use previous data which has completed post-processing. These data may be retrieved from PF2 MEM 38 and loaded into the first two rows 710 (in FIG. 7) of the corresponding one of memory areas 42, 44, 46, 48 or 50, for example, before the deringing filter 54 proceeds.

In one example embodiment, data from PF1 MEM 36 are written into SRAM_0 from position 2 to 17, at locations designated 720 in FIG. 7. Data from PF2 MEM 38 are written into the remaining SRAM_0 positions 0 to 1, or locations designated 710 in FIG. 7. Data from 2 to 17 are used for the vertical deblocking process and data from 0 to 17 are used for Deringing process.

Deblock module 52 is functionally the same as the deblock module 32 in the horizontal deblocking filter 24. In some embodiments, the deblocking order within a macroblock is from top to bottom and from left to right for Y, U and V data for the vertical deblocking.

The deringing filter module 54 performs the deringing operations, which may include three subprocesses: Threshold determination 56, index acquisition 60 and adaptive smoothing 62. In an example embodiment, the deringing filter module 54 is applied to the pixels on an 8×8 block basis. More specifically, 8×8 pixels may be processed by referencing 10×10 pixels in each block. Therefore, 10×10 blocks of data may be used for the deringing operation, which outputs an 8×8 block of filtered data.

The deringing filter module 54 can include two subunits: a deringing threshold subunit 56 and a deringing subunit 58. The deringing threshold subunit 56 performs the first subprocess, which is to determine the threshold and range of the macroblock of data currently being processed. Deringing subunit 58 performs the index acquisition subprocess 60 and the signal adaptive filtering 62, which constitutes the actual deringing filtering. The details of the deringing filter module 54 are shown in FIG. 6.

The range calculation determined by the deringing threshold subunit 56 can be based on the difference between the maximum and minimum gray value within a block in the decoded image. In some embodiments, the threshold is essentially the average of the maximum and minimum gray values in the block:

$$range[k]=max[k]-min[k]$$

$$thr[k]=(max[k]+min[k]+1)/2$$

In some embodiments, deringing threshold unit 56 can read eight pixels of a block at a time. After reading all the pixels in a block, deringing threshold unit 56 determines the threshold and range of the block. The algorithm then repeats until the threshold and range of every block in a macroblock are determined. For a luminance block (i.e. a Y block), the deringing threshold unit also performs threshold rearrangement, wherein the threshold rearrangement replaces the measured threshold with the maximum threshold among a set of four blocks, as described in the MPEG-4 ISO/IEC 14496-2 specification. In some embodiments, it takes 36 clock cycles to finish this process for a macroblock.

When deringing threshold subunit 56 is finished, the deringing subunit 58 can begin. Deringing subunit 58 starts by reading in 10×10 pixels of data to process one block. Filtering may be applied on a pixel-by-pixel basis, in the order from left to right and from top to bottom within a block. In every clock cycle, the binary index 60 may be determined and the adaptive smoothing 62 with clipping may be performed for a pixel. The binary index 60 determines values for the array bin(h,v) based on the gray value of the data rec(h,v) at coordinates (h,v) where h,v=0, 1, 2, . . . 7, and the calculated threshold value, according to $$bin(h, v)=1 \text{ if } rec(h, v) \geq thr$$

$$bin(h, v)=0 \text{ otherwise.}$$

The binary index value bin(h,v) indicates which pixels are to be subjected to the signal adaptive filtering algorithm. That is, in some embodiments the signal adaptive filter 62 is applied only if the binary indices in a 3×3 window are all the same, i.e., all "0" indices or all "1" indices. Note that the 10×10 binary indices may be obtained with a single threshold which corresponds to the 8×8 block. These procedures are further described in the MPEG-4 specification, or ISO/IEC 14496-2.

The signal adaptive filter (SAF) 62 included in deringing filter subunit 58 is a smoothing filter applied to the data using a 3×3 filter mask window. The SAF filter 62 is applied by the deringing subunit 58. Assuming the pixel at (0, 0) is the pixel to be filtered, the SAF filter 62 outputs, for example, $$Flt'(h, v) = \{8 + \sum_{i=-1}^{1} \sum_{j=-1}^{1} coef(i, j)rec(h+i, v+j)\}/16$$

Where the filter coefficients coef(i,j), in some embodiments, with i,j=−1, 0, 1, are:

$$\begin{bmatrix} 1 & 2 & 1 \\ 2 & 4 & 2 \\ 1 & 2 & 1 \end{bmatrix}$$

The maximum gray level change between the reconstructed pixel rec(h,v) and the filtered one Flt'(h,v) is limited according to the quantization parameter, i.e., QP. This is the clipping operation, which is performed on each pixel of filtered data, and is described fully in the MPEG-4 specification ISO/IEC 14496-2.

In some embodiments, it may take a total of 424 clock cycles to finish the deringing process on a macroblock. Therefore the deringing process performed by deringing filter 54 may be computationally the most intensive operation, compared to, for example, the operation of deblocking filters 52 and 32. The deringing process may also require a large number of memory accesses, as every pixel and its surrounding pixels may be evaluated before proceeding with the deringing subunit 58 filtering. By storing the data being processed locally, in local memory 27, which can be fast SRAM memory for example, the overall speed of the filtering operations may be improved. After performing vertical deblocking and deringinging filter operations on two macroblock rows of Y data, one row of U data and V data may be processed.

As shown in FIG. 6, control unit 40 includes interfaces to memory module 12, deblocking filter 52, deringing filter 54, and local memory 27. State machine 64 controls the flow of data through vertical blocking and deringing filter 26. In the embodiment shown in FIG. 6, local memory 27 includes local memory areas 42, 44, 46, 48 and 50 which can be blocks of SRAM memory SRAM_0 through SRAM_4, respectively.

For the first macroblock row of Y data, control unit 40 reads one macroblock of data and a quantization parameter (QP) from PF1 MEM 36. The QP will be used by deringing filter 54 to determine the clipping level, as described above. The macroblock of data retrieved from PF1 MEM 36 are stored, for example, in SRAM_0. The arrangement of data for an embodiment of memory SRAM_0 through SRAM_4, for example, is shown in FIG. 7. As shown in FIG. 7, positions 0 and 1 are loaded with data from PF1 MEM 38, which is then utilized in deringing filter 54. Positions 2-17 are loaded with data from PF1 MEM 36, which has not yet been processed by vertical deblocking and deringing filter 26. The data loaded into positions 0 and 1 represent processed and filtered data along the boundaries of previous macroblocks.

Figure 8A:
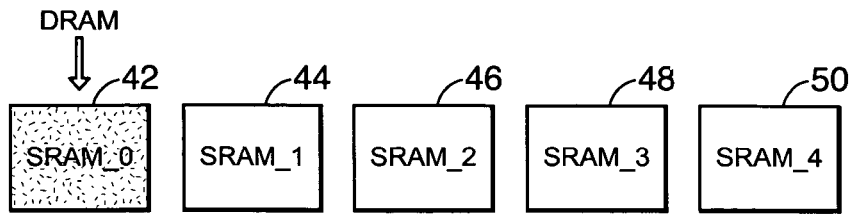
FIGS. 8(A) through 8(E) show diagrammatically the processing of data stored in the internal memory of the embodiment of vertical deblocking and deringing filter shown in FIG. 6.

The processing of data stored in local memory areas 42, 44, 46, 48, and 50 (SRAM_0 through SRAM_4 in FIG. 6) is shown diagrammatically in FIGS. 8(A) through 8(E). As shown in FIG. 8(A), local memory area 42 is loaded with a macroblock of data from PF1 MEM 36. As discussed above, with respect to FIG. 7, the macroblock of data is loaded into positions 2 through 17 of local memory area 42. Local memory area 42 is then also loaded with the next macroblock in the row of macroblocks from PF1 MEM 36. Each of local memory areas 42, 44, 46, 48 and 50 (SRAM_0 through SRAM_4, respectively) stores one macroblock of data. The macroblock of data is stored in positions 2 through 17 while positions 0 and 1 can be utilized to store two extra pixel rows of data from neighboring macroblocks that had been stored in PF2 MEM 38 already.

Figure 8B:
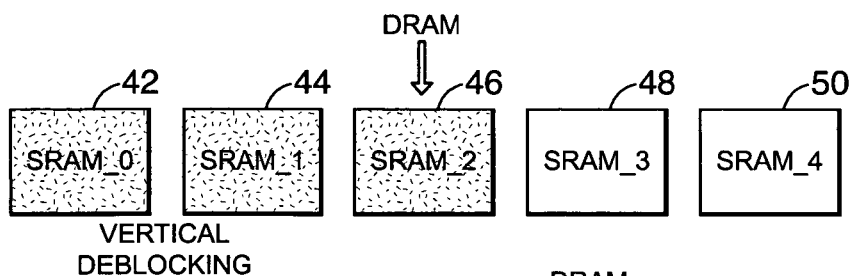

As shown in FIG. 8(B), after two macroblocks of Y data have been loaded into, for example, local memory areas 42 and 44, PF2 control unit 40 signals vertical deblock filter 52 to begin processing on local memory area 42. Meanwhile, the next macroblock is being loaded into the next memory area, local memory area 46 in FIG. 8(B). In order to perform the vertical deblocking operation on a vertical boundary between, for example, local memory area 42 and local memory area 44, deblocking filter 52 uses data from previously processed columns in the adjacent local memory 42, for example the last five columns in local memory 42, in order to span the vertical boundary. The vertical boundary is, for example, the first column of data in local memory 44, representing the edge of the macroblock stored in local memory 44.

Figure 8C:
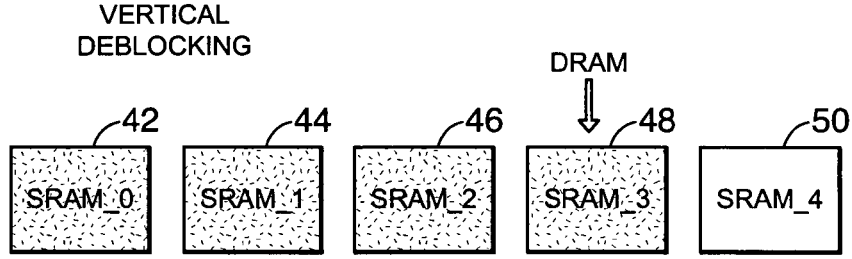
Figure 8D:
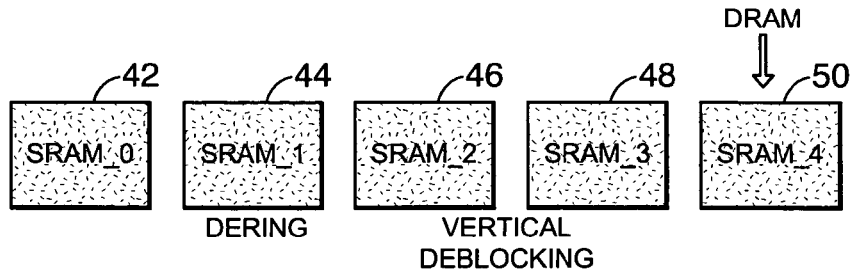

As shown in FIG. 8(C), while data is being loaded into local memory 48, vertical deblocking filter 52 is processing data in local memory 44 and dering filter 54 starts processing data in local memory 42. As shown in FIG. 8(D), the process continues sequentially in round-robin fashion through each of local memory areas 42, 44, 46, 48 and 50, with a macroblock two macroblocks ahead of the macroblock being processed in vertical deblocking filter 52 being loaded into one of the local memory areas while vertical deblocking and deringing operations are also being performed on already loaded data. Once the processing of local memory area 42 is complete, then the data can be written, as shown in FIG. 8(E), into PF2 MEM 38 by control unit 40.

Figure 8E:
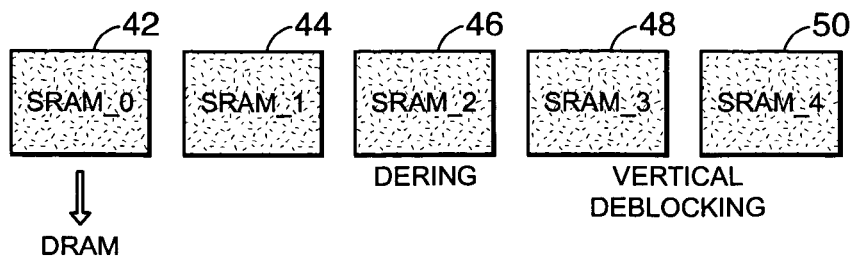

Therefore, as shown in FIG. 8(E), two adjacent macroblocks in, for example local memory areas 48 and 50, are being processed by vertical deblocking filter 52. Deringing filter 54 can be processing data in local memory area 44 and 46. Local memory area 42 is being written to PF2 MEM 38 and then data from PF1 MEM 36 and PF2 MEM 38 is being loaded into local memory area 42. Therefore, the total minimum memory requirement for this embodiment includes five 18×128 register files to hold five macroblocks of data. As before, local memory area can be SRAM. Once deblocking is finished for a macroblock, PF2 control unit 40 starts to perform the deringing operation on the macroblock. After the deringing process is complete, the macroblock of data are written into PF2 MEM 38 for output to the Decoder Image Processor (DCIP) 22 for output to the display device.

For the deringing filter process on the other macroblock rows, two extra pixel rows are read first from PF2 MEM 38, which holds data that has completed post-filtering in the previous cycle. Data from PF2 MEM 38 are stored in SRAM position 0 to 1, for use by the deringing filter module 54. The U and the V data are processed in the same way, with two extra pixel rows retrieved from PF2 MEM 38 to satisfy the data input requirements of the deringing filter.

Once the deringing process is complete, vertical deblocking and deringing filter 26 sends a request to memory module 12 to write data to the memory. Memory module 12 acknowledges and grants the request, and the data in local memory 27 is written into PF2 MEM 38. The next macroblock of Y data is processed as described, until the entire row is completed.

The use of two separate memory areas, PF1 MEM 36 and PF2 MEM 38, within memory module 12, allows areas of memory module 12 to operate simultaneously, that is, PF1 MEM 36 can store the output of the horizontal deblocking filter 24, and fill local memory 27 for processing by vertical deblocking and deringing filter 26, while PF2 MEM 38 is storing the data output from vertical deblocking and deringing filter 26 from local memory 27. Data from PF2 MEM 38 will subsequently be output to the DCIP 22.

In some embodiments of the invention, a two-row counter 25 (see FIG. 2) is included to monitor the decoding process between the vertical deblocking and deringing filter 26 and the horizontal deblocking filter 24. Counter 25 increases by one when the horizontal deblocking filter 24 finishes processing two macroblock rows of data. If the counter is greater than a maximum value, then PF2 control unit 40 sends a level signal to the PF1 control unit 28 to halt the horizontal deblocking process. PF2 control unit 40 stops the vertical deblocking process when the counter is smaller than a minimum value. DCIP 22 can also stop the vertical deblocking process by asserting a halt signal to the PF2 control unit 40.

By dividing the functions of horizontal deblocking filter 24 from vertical deblocking and deringing filter 26, into separate, independent modules, the processes can proceed in parallel, thereby improving throughput by pipelining the data. By using local memory 27 to store data during processing, the speed of the modules can be enhanced, especially for the computationally intensive operation of deringing subunit 58. Bandwidth requirements for memory module 12 are thereby reduced in this embodiment compared to alternative implementations.

The embodiments described above are illustrative only and are not intended to be limiting. One skilled in the art may recognize various possible modifications that are intended to be within the spirit and scope of this disclosure. As such, the invention is limited only by the following claims.

I claim:

1. A post-filter comprising:
a horizontal deblocking filter coupled to receive video image data and coupled to store horizontally deblocked data in a first memory area of a memory system; and
a vertical deblocking and deringing filter coupled to receive the horizontally deblocked data from the first memory area and coupled to store filtered data in a second memory area of the memory system;
wherein the vertical deblocking and deringing filter includes a local memory for internal data storage of horizontally deblocked data while vertical deblocking and deringing functions are performed by the vertical deblocking and deringing filter.

2. The post-filter of claim 1, wherein the local memory comprises a plurality of local memory areas, each of the plurality of local memory areas storing at least a macroblock of horizontally deblocked data received from the first memory area.

3. The post-filter of claim 2, wherein each of the plurality of local memory areas comprises an 128×18 bit array of static random access memory.

4. The post filter of claim 1, wherein the memory system comprises dynamic random access memory.

5. The post-filter of claim 1, wherein the horizontal deblocking filter further comprises a first control unit, the vertical deblocking and deringing filter further comprises a second control unit, and wherein said second control unit operates in parallel with said first control unit.

6. The post-filter of claim 5, wherein the video image data is received by the first control unit from a motion compensation module and is stored in data registers of the first control unit.

7. The post-filter of claim 6, wherein additional data required by the horizontal deblocking filter for deblocking across a horizontal boundary is obtained from the first memory area and loaded into data registers of the first control unit along with the data received from the motion compensation module.

8. The post-filter of claim 7, wherein the horizontal deblocking filter operates on five pixels of data on either side of the horizontal boundary in a macroblock.

9. The post-filter of claim 7, wherein the horizontal deblocking filter can alter the values of four pixels on either side of the horizontal boundary in a DC offset mode.

10. The post-filter of claim 7, wherein the horizontal deblocking filter can alter the value of one pixel on either side of the horizontal boundary in a default mode.

11. The post-filter of claim 1, wherein the vertical deblocking and deringing filter processes horizontally deblocked data read from the first memory area concurrently with the horizontal deblocking filter generating the filtered data to be written into the first memory area.

12. The post-filter of claim 1, wherein the vertical deblocking and deringing filter processes data in parallel with the horizontal deblocking filter module.

13. The post-filter of claim 1, wherein said second memory area stores the filtered data from the vertical deblocking and deringing filter for output to a decoder image processing module.

14. The post-filter of claim 1, wherein the vertical deblocking and deringing filter further comprises:
 a vertical deblocking module coupled to process data stored in the local memory; and
 a deringing module coupled to process data stored in the local memory.

15. The post filter of claim 14, wherein the local memory includes a plurality of local memory areas, each of the local memory areas capable of storing at least one macroblock of data.

16. The post filter of claim 15, wherein a macroblock of data includes a plurality of blocks of data.

17. The post filter of claim 16, wherein each block of data can include data for an 8×8 array of pixels.

18. The post-filter of claim 16, wherein the deringing module further comprises:
 a threshold determining module, and
 a deringing block filter module coupled to the threshold determining module.

19. The post-filter of claim 14, wherein for a first macroblock row, a first local memory area is loaded with sixteen rows of data from said first memory area corresponding to a first macroblock of data, and a second local memory area is loaded with sixteen rows of data from a subsequent macroblock of data.

20. The post-filter of claim 19, wherein for a subsequent macroblock row, two additional local memory areas are loaded with sixteen rows of data from said first memory area, and two additional rows of data from said second memory area, which has previously been processed by the vertical deblocking and deringing filter, for processing by the vertical deblocking and deringing filter.

21. The post-filter of claim 15, wherein the vertical deblocking module operates on data stored in two local memory areas, and the deringing module operates on data stored in two local memory areas.

22. The post-filter of claim 14, wherein the vertical deblocking module can alter the values of five pixels on either side of a vertical boundary in a macroblock.

23. The post-filter of claim 14, wherein the vertical deblocking module can alter the values of four pixels on either side of a vertical boundary in a DC offset mode.

24. The post-filter of claim 14, wherein the vertical deblocking module alters the value of one pixel on either side of a vertical boundary in a default mode.

25. The post-filter of claim 18, wherein the threshold determining module calculates a threshold for each block, based on an average of maximum and minimum gray scale values within the block.

26. The post-filter of claim 18, wherein the threshold determining module calculates a range for each block based on a difference between maximum and minimum gray scale values within the block.

27. The post-filter of claim 18, wherein the deringing block filter module performs a binary index and clipping operation for each pixel element in a block of video data.

28. The post-filter of claim 27, wherein the deringing block filter module further performs a signal adaptive filtering of each pixel element indicated by the binary index in a block of video data.

29. The post-filter of claim 18, wherein the deringing block filter module addresses all entries in one of the plurality of local memory areas.

30. A method for post-filtering macroblocks of image data, the method comprising:
 receiving macroblocks of image data from a motion compensation module;
 performing horizontal deblocking on the image data to form horizontally deblocked data;
 storing said horizontally deblocked data in a first memory area of a memory system;
 retrieving the horizontally deblocked data from the first memory area and storing the horizontally deblocked data in an internal memory;
 performing vertical deblocking and deringing on horizontally deblocked data stored in the internal memory; and
 storing filtered data in a second memory area.

31. The method of claim 30, wherein the receiving of macroblocks of image data comprises receiving a macroblock of Y data, followed by a block of U data, a block of V data, and a quantization parameter, from a motion compensation module.

32. The method of claim 30, wherein performing horizontal deblocking further comprises retrieving a plurality of rows of horizontally deblocked data from the first memory area.

33. The method of claim 30, wherein performing horizontal deblocking further comprises retrieving six rows of horizontally deblocked data from the first memory system.

34. The method of claim 30, wherein performing vertical deblocking and deringing further comprises retrieving a plurality of rows of macroblock data and a quantization parameter from the first memory area, the macroblock data having been horizontally deblocked.

35. The method of claim 30, wherein performing vertical deblocking and deringing further comprises retrieving two rows of additional image data from filtered data stored in the second memory area.

36. The method of claim 30, wherein performing horizontal deblocking comprises performing horizontal deblocking on five pixels on either side of a horizontal boundary in a macroblock of image data.

37. The method of claim 30, wherein performing horizontal deblocking comprises altering the values of four pixels on either side of a horizontal boundary in a macroblock of image data in a DC offset mode.

38. The method of claim 30, wherein performing horizontal deblocking comprises altering the values of one pixel on either side of a horizontal boundary in a macroblock of image data in a default mode.

39. The method of claim 30, further comprising outputting the filtered data from the second memory area to a decoder image processor.

40. The method of claim 30, wherein performing vertical deblocking and deringing comprises performing deblocking on five pixels on either side of a vertical boundary in a macroblock of horizontally deblocked data.

41. The method of claim 30, wherein performing vertical deblocking and deringing comprises altering the values of four pixels on either side of a vertical boundary in a macroblock of horizontally deblocked data in a DC offset mode.

42. The method of claim 30, wherein performing vertical deblocking and deringing comprises altering the value of one pixel on either side of a vertical boundary in a macroblock of horizontally deblocked data in a default mode.

43. The method of claim 30, wherein storing said image data in a first memory area comprises storing image data and a quantization parameter in the first memory area of memory system.

44. The method of claim 30, wherein performing vertical deblocking and deringing further comprises calculating a threshold for each block of a macroblock based on an average of maximum and minimum gray scale values within the block.

45. The method of claim 30, wherein performing vertical deblocking and deringing further comprises calculating a range for each block of a macroblock based on a difference between maximum and minimum gray scale values within the block.

46. The method of claim 30, wherein performing vertical deblocking and deringing further comprises performing a binary index and clipping operation for each pixel element in a block of a macroblock.

47. The method of claim 46, wherein performing vertical deblocking and deringing further comprises performing signal adaptive filtering of each pixel element indicated by the binary index in the block.

48. A post filter, comprising:
means for memory storage including at least a first memory area and a second memory area;
means for horizontally deblocking macroblocks of image data and storing resulting horizontally deblocked data in the first memory area;
means for vertical deblocking and deringing the horizontally deblocked data and storing resulting filtered data in the second memory area.

49. An image processing system, comprising:
a host interface to receive compressed data from a network;
a memory module coupled to the host interface to receive and store the compressed data;
a variable length decoder coupled to the memory module to receive the compressed data stored in the memory module, the variable length decoder recovering motion compensation data and transformed data from the compressed data;
an inverse discrete cosine transform module coupled to receive the transformed data from the variable length decoder, the inverse discrete cosine transform module recovering a spatial image from the transformed data;
a motion compensation module coupled to receive the spatial image from the inverse discrete cosine transform module and the motion compensation data from the variable length decoder to construct video image data; and
a post filter coupled to receive the video image data from the motion compensation module, the post filter comprising
a horizontal deblocking filter coupled to receive video image data and coupled to store horizontally deblocked data in a first memory area of a memory system, and
a vertical deblocking and deringing filter coupled to receive the horizontally deblocked data from the first memory area and coupled to store filtered data in a second memory area of the memory system,
wherein the vertical deblocking and deringing filter includes a local memory for internal data storage of horizontally deblocked data while vertical deblocking and deringing functions are performed by the vertical deblocking and deringing filter.

* * * * *